United States Patent [19]
Heisler

[11] Patent Number: 6,028,291
[45] Date of Patent: Feb. 22, 2000

[54] HEATED WINDSHIELD WIPER SYSTEM

[76] Inventor: Ronald D. Heisler, 1409 8th Ave. West, Devils Lake, N. Dak. 58301

[21] Appl. No.: 09/267,051

[22] Filed: Mar. 12, 1999

[51] Int. Cl.⁷ ................................. H05B 3/84; B60L 1/02
[52] U.S. Cl. ......................................... 219/203; 15/250.07
[58] Field of Search ........................... 15/250.04, 250.06; 219/200–204

[56] References Cited

U.S. PATENT DOCUMENTS

| | | | |
|---|---|---|---|
| 3,574,881 | 4/1971 | Temple | 15/250.04 |
| 4,387,290 | 6/1983 | Yasuda | 219/202 |
| 5,412,177 | 5/1995 | Clark | 219/203 |
| 5,831,242 | 11/1998 | Gallagher | 219/202 |

*Primary Examiner*—Tu Ba Hoang

[57] ABSTRACT

A heated windshield wiper system for reducing the accumulation of ice and snow upon a vehicle's windshield wipers during cold weather conditions. The inventive device includes a blade member having a passageway extending through a central portion thereof, a heating element removably positioned within the passageway, an electronic control circuit electrically connected to the heating element for controlling the heating element, a plurality of arm photovoltaic cells attached to the wiper arm and electrically connected to the electronic control circuit, and a plurality of frame photovoltaic cells attached to the wiper frame and electrically connected to the electronic control circuit. The electronic control circuit includes a battery within for providing electrical power to the heating element during darkness. The electronic control circuit may also include an electrical connection to the vehicle's power system. An activation indicator is connected to the electronic control circuit for visually indicating to the driver when the heating element is receiving electrical power. A pair of electrical connectors are electrically connectable together thereby releasably electrically connecting the electronic control circuit to the heating element allowing the heating element to be replaced. A thermostat within the electronic control circuit activates and deactivates the heating element depending upon the outside air temperature.

16 Claims, 4 Drawing Sheets

HEATED WINDSHIELD WIPER SYSTEM

BACKGROUND OF THE INVENTION

1. Field of the Invention

The present invention relates generally to windshield wipers and more specifically it relates to a heated windshield wiper system for reducing the accumulation of ice and snow upon a vehicle's windshield wipers during cold weather conditions.

Windshield wipers are utilized upon vehicles that have windshields in order to maintain a clear view for the driver of the vehicle from rain or snow. During cold weather, precipitation accumulates upon the windshield wiper, including the wiper blade, thereby preventing the windshield wiper blade from making contact with the windshield thereby leaving a "blurred" windshield that is extremely dangerous for drivers. Therefore, there is a need for a windshield wiper blade assembly that is not prone to freezing precipitation during cold weather.

2. Description of the Prior Art

Windshield wipers have been in use for years. Typically, a conventional windshield wiper will include a wiper arm, a wiper frame attached to the wiper arm, and a rubber wiper blade removably attached to the wiper frame. During use, the wiper arm is powered by an actuator in a cyclical motion thereby "cleaning" the outside of the windshield from rain and snow. During cold weather conditions, the rain and snow will build up on the windshield wiper and the rubber wiper blade causing large streaks across the windshield effectively blocking the driver's vision.

To remove the accumulated ice and snow from the windshield wiper, the driver of the vehicle often times will stop the vehicle and "snap" the windshield wiper upon the windshield in an attempt to break apart the accumulated ice and snow. Often times a portion of the accumulated ice and snow will remain upon the windshield wiper making it still difficult for the driver to navigate the vehicle.

While these devices may be suitable for the particular purpose to which they address, they are not as suitable for eliminating ice and snow accumulation upon a windshield wiper thereby preventing interference with the wiper's operation. The only method of removing accumulated ice and snow from a conventional windshield wiper comprises the driver opening the door or window to allow them to "snap" the windshield wiper against the windshield which is extremely dangerous and undesirable for the driver.

In these respects, the heated windshield wiper system according to the present invention substantially departs from the conventional concepts and designs of the prior art, and in so doing provides an apparatus primarily developed for the purpose of eliminating ice and snow accumulation upon a windshield wiper thereby preventing interference with the wiper's operation.

SUMMARY OF THE INVENTION

In view of the foregoing disadvantages inherent in the known types of windshield wipers now present in the prior art, the present invention provides a new heated windshield wiper system construction wherein the same can be utilized for eliminating ice and snow accumulation upon a windshield wiper thereby preventing interference with the wiper's operation.

The general purpose of the present invention, which will be described subsequently in greater detail, is to provide a new heated windshield wiper system that has many of the advantages of the windshield wipers mentioned heretofore and many novel features that result in a new heated windshield wiper system which is not anticipated, rendered obvious, suggested, or even implied by any of the prior art windshield wipers, either alone or in any combination thereof.

To attain this, the present invention generally comprises a blade member having a passageway extending through a central portion thereof, a heating element removably positioned within the passageway, an electronic control circuit electrically connected to the heating element for controlling the heating element, a plurality of arm photovoltaic cells attached to the wiper arm and electrically connected to the electronic control circuit, and a plurality of frame photovoltaic cells attached to the wiper frame and electrically connected to the electronic control circuit. The electronic control circuit includes a battery within for providing electrical power to the heating element during darkness. The electronic control circuit may also include an electrical connection to the vehicle's power system. An activation indicator is connected to the electronic control circuit for visually indicating to the driver when the heating element is receiving electrical power. A pair of electrical connectors are electrically connectable together thereby releasably electrically connecting the electronic control circuit to the heating element allowing the heating element to be replaced. A thermostat within the electronic control circuit activates and deactivates the heating element depending upon the outside air temperature.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a heated windshield wiper system that will overcome the shortcomings of the prior art devices.

Another object is to provide a heated windshield wiper system that reduces the accumulation of ice and snow upon a windshield wiper including the wiper blade.

An additional object is to provide a heated windshield wiper system that increases a driver's visibility while driving in cold weather conditions.

A further object is to provide a heated windshield wiper system that can be utilized during both cold and warm weather conditions.

Another object is to provide a heated windshield wiper system that is affordable and marketable for the average consumer.

A further object is to provide a heated windshield wiper system that is capable of utilizing the vehicle's existing electric system for providing heat to the windshield wiper including the wiper blade.

Another object is to provide a heated windshield wiper system that can either be installed directly upon new vehicles or retro-fitted upon existing wiper frames.

Another object is to provide a heated windshield wiper system that utilizes solar energy to heat the windshield wiper blades.

An additional object is to provide a heated windshield wiper system that allows the heating element to be removed from the blade member for repair or replacement.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
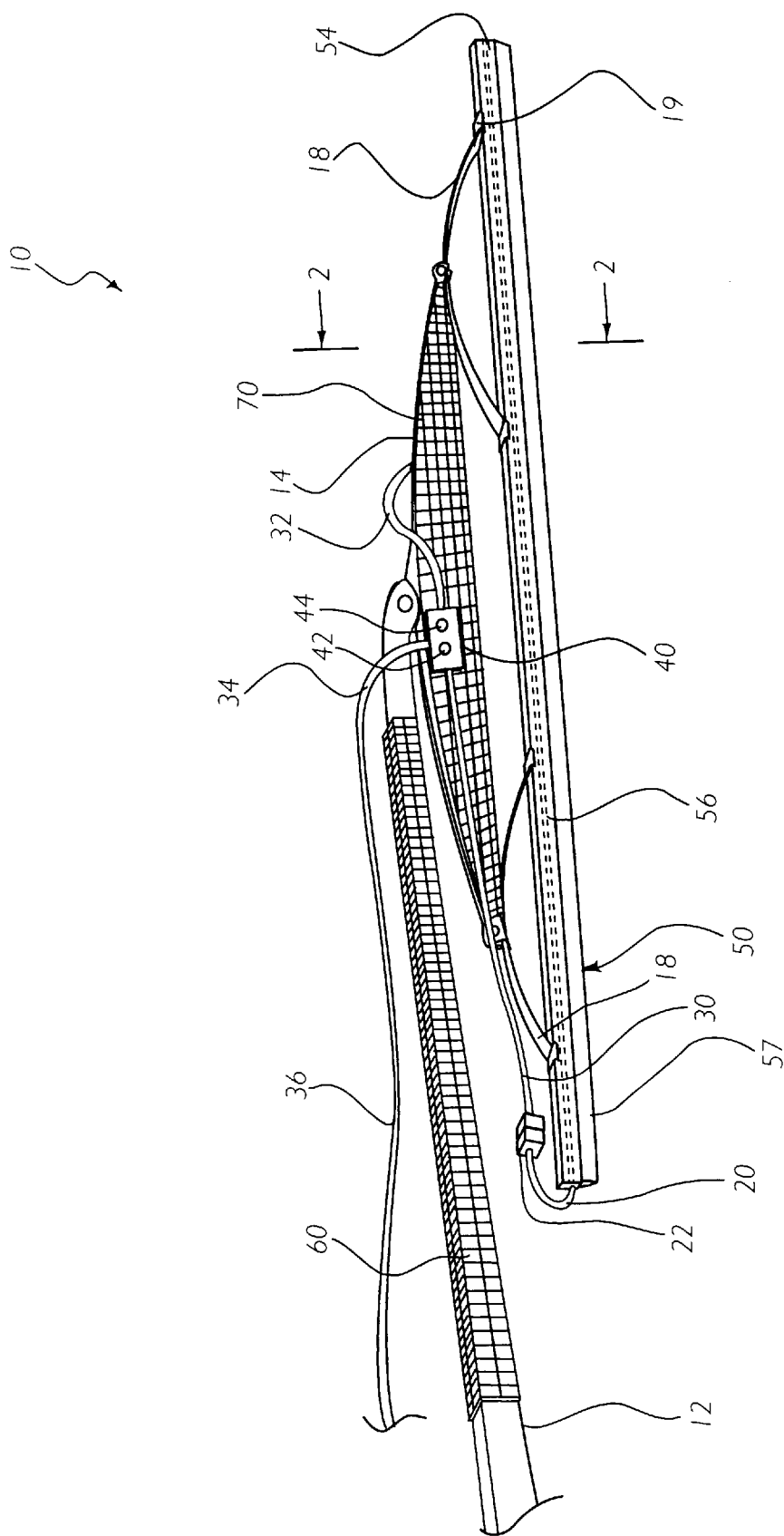
FIG. 1 is an upper perspective view of the present invention.

Turning now descriptively to the drawings, in which similar reference characters denote similar elements throughout the several view, FIGS. 1 through 4 illustrate a heated windshield wiper system 10, which comprises a blade member 50 having a passageway 56 extending through a central portion thereof, a heating element 20 removably positioned within the passageway 56, an electronic control circuit 40 electrically connected to the heating element 20 for controlling the heating element 20, a plurality of arm photovoltaic cells 60 attached to the wiper arm 12 and electrically connected to the electronic control circuit 40, and a plurality of frame photovoltaic cells 70 attached to the wiper frame 14 and electrically connected to the electronic control circuit 40. The electronic control circuit 40 includes a battery within for providing electrical power to the heating element 20 during darkness. The electronic control circuit 40 may also include an electrical connection to the vehicle's power system. An activation indicator 42 is connected to the electronic control circuit 40 for visually indicating to the driver when the heating element 20 is receiving electrical power. A pair of electrical connectors 22 are electrically connectable together thereby releasably electrically connecting the electronic control circuit 40 to the heating element 20 allowing the heating element 20 to be replaced. A thermostat within the electronic control circuit 40 activates and deactivates the heating element 20 depending upon the outside air temperature.

Figure 3:
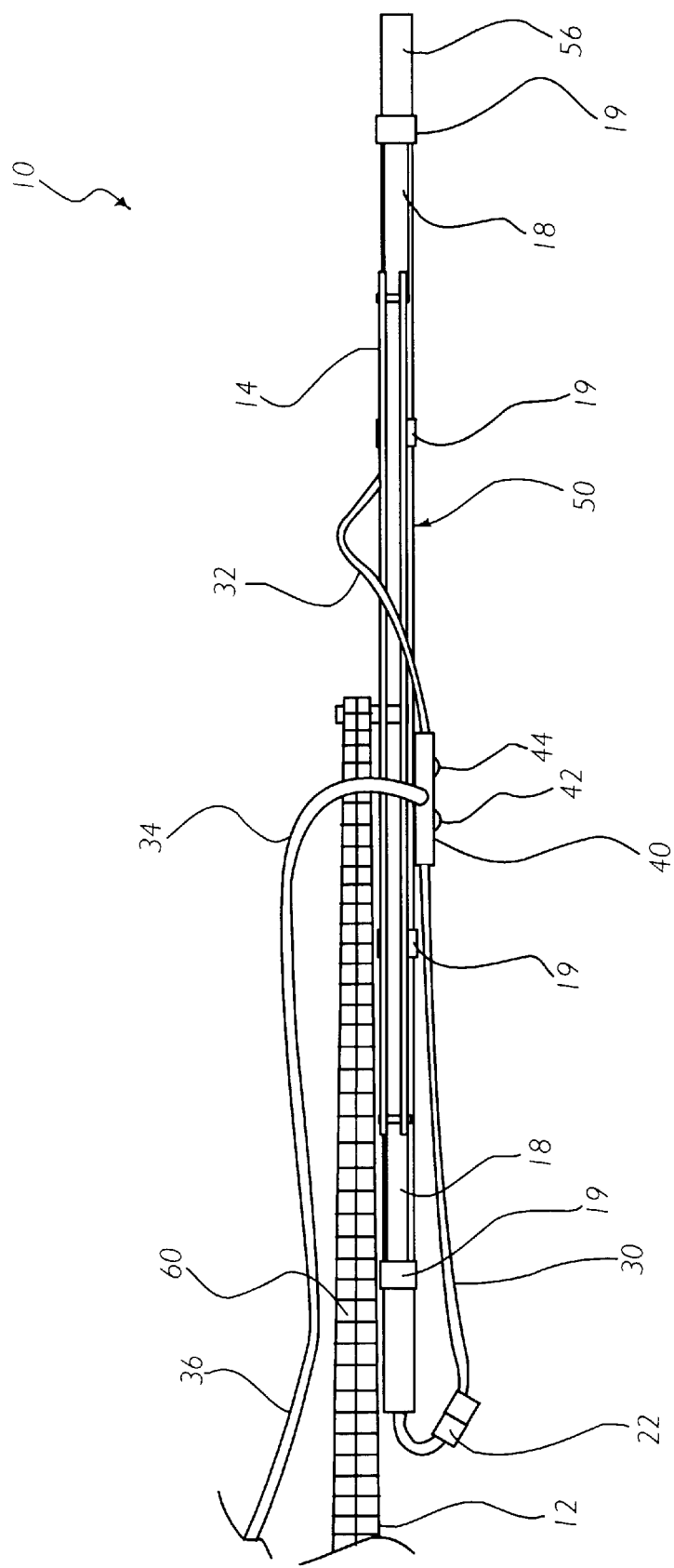
FIG. 3 is a top view of the present invention.

A conventional windshield wiper comprises a motorized wiper arm 12, a wiper frame 14 attached to the wiper arm 12, a plurality of spring members 18 attached to wiper frame 14, and a blade member 50 catchably secured to the spring members 18 by a plurality of clamps 19 as shown in FIGS. 1 and 3 of the drawings.

Figure 2:
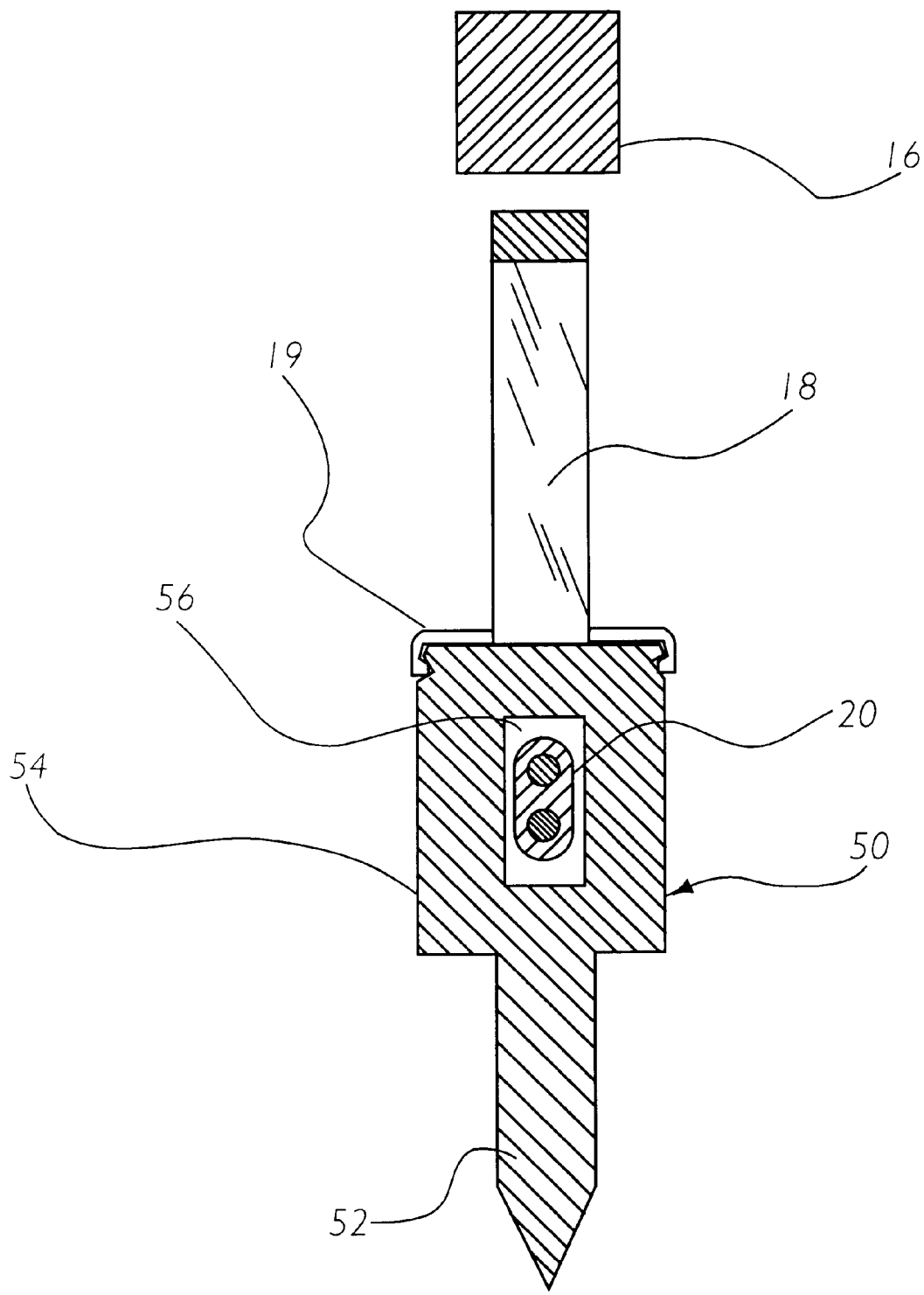
FIG. 2 is a cross sectional view taken along line 2—2 of FIG. 1.

As shown in FIGS. 1 and 2, the blade member 50 includes a blade body 54 and a blade edge 52. The blade body 54 is attached to the clamps 19 of the spring members 18. The blade edge 52 is narrower than the blade body 54 and engages the outside surface of the windshield for acting as a "squeegee" for removing precipitation from the windshield.

As shown in FIG. 2 of the drawings, the blade body 54 includes a passageway 56 exposed in at least one end of the blade body 54. The passageway 56 removably receives the heating element 20 as shown in FIGS. 1 and 2. The heating element 20 is comprised of conventional heating wire that produces heat when an electrical current is passed through because of the resistance within the heating wire. The passageway 56 preferably has a rectangular cross section, however any well-known shape may be utilized for snugly receiving the heating element 20.

As shown in FIGS. 1 and 3, the electronic control circuit 40 is securable to either the wiper arm 12 or wiper frame 14. The electronic control circuit 40 is electrically connected to the heating element 20 by a first wire 30. A pair of mating electrical connectors 22 within the first wire 30 allow the heating element 20 to be removed and replaced within the blade body 54 if the heating element 20 should become damaged.

Figure 4:
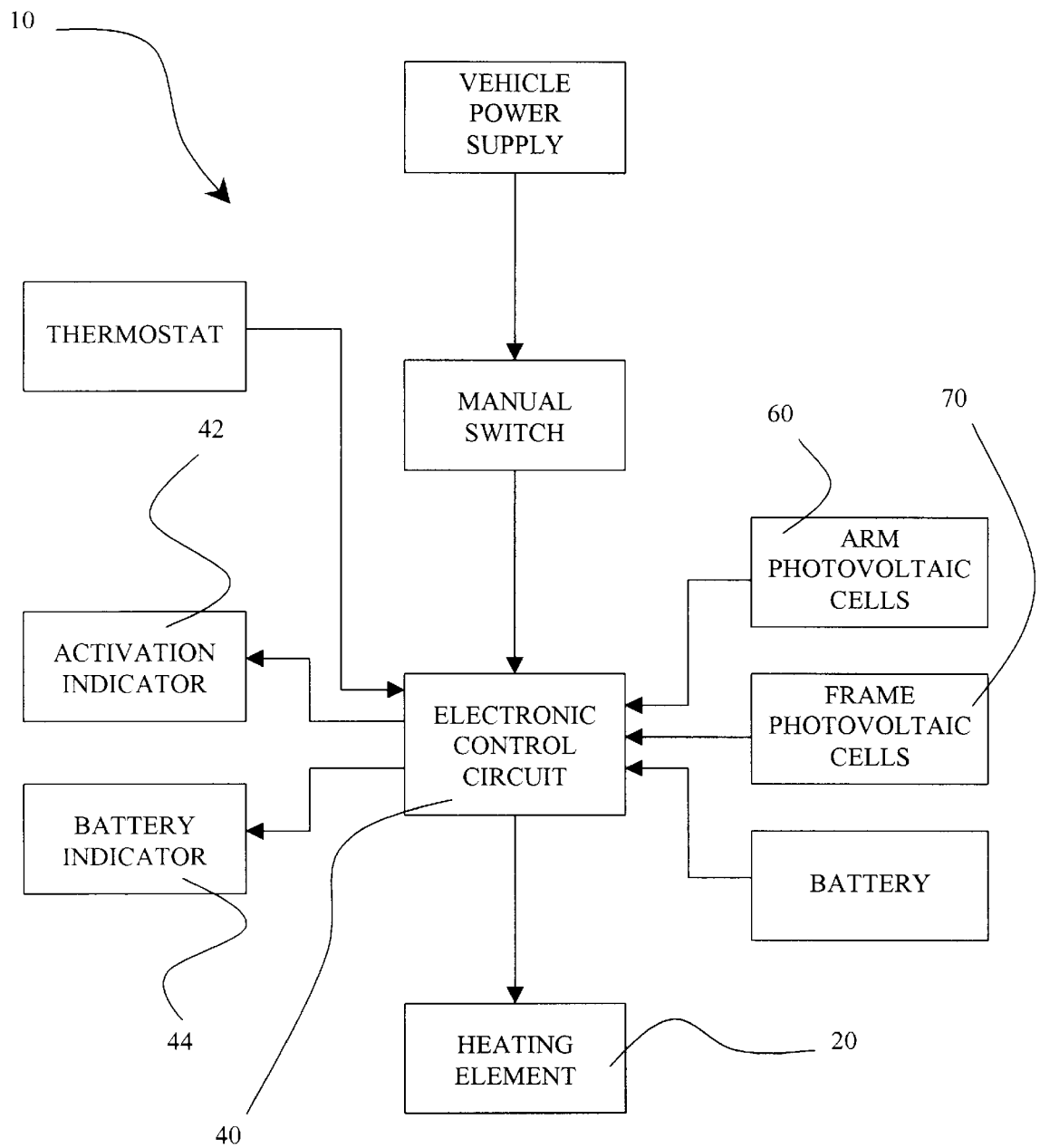
FIG. 4 is a box diagram illustration of the electrical components of the present invention.

As shown in FIGS. 1, 3 and 4 of the drawings, the electronic control circuit 40 is electrically connected to a manual switch by a fourth wire 36. The manual switch is electrically connected to the vehicle power supply for providing constant electrical power to the electronic control circuit 40.

As shown in FIGS. 1, 3 and 4 of the drawings, the frame photovoltaic cells 70 are electrically connected to the electronic control circuit 40 by a second wire 32. The arm photovoltaic cells 60 are electrically connected to the electronic control circuit 40 by a third wire 34.

As shown in FIGS. 1 and 3, the arm photovoltaic cells 60 are secured to the wiper arm 12 for collecting solar energy from sunlight and converting it to electricity for the electronic control circuit 40. As shown in FIGS. 1 and 3, the frame photovoltaic cells 70 are secured to the wiper frame 14 for collecting solar energy from sunlight and converting it to electricity for the electronic control circuit 40.

As best shown in FIGS. 1 and 4 of the drawings, an activation indicator 42 is secured to the housing of the electronic control circuit 40 and is electrically connected to the electronic control circuit 40. The activation indicator 42 is preferably a light emitting device such as an LED for indicating to the driver of the vehicle when the heating element 20 is activated.

As shown in FIG. 4 of the drawings, the electronic control circuit 40 preferably includes a battery within for providing electrical power to the heating element 20 during darkness. As shown in FIG. 1 of the drawings, a battery indicator 44 is secured to the housing of the electronic control circuit 40 and is electrically connected to the electronic control circuit 40. The battery indicator 44 is preferably a light emitting device such as an LED for indicating to the driver of the vehicle when the battery is being utilized to power the heating element 20.

In use, the user has the option of closing the manual switch for providing electrical power to the electronic control circuit 40. The user will normally leave the manual switch open for preventing deterioration of the vehicle power supply. The thermostat detects the outside temperature and electrically transmits the temperature information to the electronic control circuit 40. If the temperature is below a predetermined level, such as 34 degrees Fahrenheit, the electronic control circuit 40 will activate electrical power to the heating element 20 and the activation indicator 42. The lighting of the activation indicator 42 simultaneously tells the driver that the heating element 20 is being activated and that icy road conditions could occur thereby promoting safety for the driver. The heating element 20 heats the passageway 56 and the blade body 54 thereby reducing and preventing the accumulation of ice or snow upon the blade member 50. The electricity for the heating element 20 is from the cells 60, 70 during daylight, however when darkness occurs, the battery within the electronic control circuit 40 powers the heating element 20 until drained to specified level. If the electric power is taken from the battery, the battery indicator 44 is simultaneously lighted to indicate to the user that the battery is being utilized within the electronic control circuit 40. If the manual switch is closed, the electrical power will be received from the vehicle power supply instead of the battery. In addition, during daylight hours, the cells 60, 70 simultaneously recharge the battery while providing electrical power to the heating element 20. The above process continues until the outside temperature rises above the predetermined level after which the electrical power to the heating element 20 is terminated.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A heated windshield wiper system comprising:
   a blade member having a blade body and a blade edge;
   a passageway within said blade member;
   a heating element removably positioned within said passageway of said blade member; and
   a power means electrically connected to said heating element;
   wherein said power means comprises:
      an electronic control circuit electrically connected to said heating element by a power cable; and
      a thermostat electrically connected to said electronic control circuit for determining when electrical power should be applied to said heating element;
   wherein said power means further includes a plurality of photovoltaic cells attached to a frame of a windshield wiper.

2. The heated windshield wiper system of claim 1, wherein said power means further includes a plurality of photovoltaic cells attached to an arm of said windshield wiper.

3. The heated windshield wiper system of claim 2, wherein said power cable includes a pair of electrical connectors near said heating element for allowing removal of said heating element from said blade body for repair or replacement.

4. The heated windshield wiper system of claim 3, wherein said electronic control circuit includes an activation indicator.

5. The heated windshield wiper system of claim 4, wherein said electronic control circuit includes a battery indicator.

6. The heated windshield wiper system of claim 5, wherein said electronic control circuit includes a battery source for providing electrical power to said heating element during darkness.

7. The heated windshield wiper system of claim 6, wherein said electronic control circuit is electrically connectable to a vehicle's power supply.

8. The heated windshield wiper system of claim 7, including a manual switch between said electronic control circuit and said power supply.

9. A heated windshield wiper system comprising:
   a wiper arm;
   a wiper frame pivotally attached to said wiper arm;
   a blade member having a blade body and a blade edge, wherein said blade member is removably attached to said wiper frame;
   a passageway within said blade member;
   a heating element removably positioned within said passageway of said blade member; and
   a power means electrically connected to said heating element;
   wherein said power means comprises:
      an electronic control circuit electrically connected to said heating element by a power cable; and
      a thermostat electrically connected to said electronic control circuit for determining when electrical power should be applied to said heating element;
   wherein said power means further includes a plurality of photovoltaic cells attached to said wiper frame.

10. The heated windshield wiper system of claim 9, wherein said power means further includes a plurality of photovoltaic cells attached to said wiper arm.

11. The heated windshield wiper system of claim 10, wherein said power cable includes a pair of electrical connectors near said heating element for allowing removal of said heating element from said blade body for repair or replacement.

12. The heated windshield wiper system of claim 11, wherein said electronic control circuit includes an activation indicator.

13. The heated windshield wiper system of claim 12, wherein said electronic control circuit includes a battery indicator.

14. The heated windshield wiper system of claim 13, wherein said electronic control circuit includes a battery source for providing electrical power to said heating element during darkness.

15. The heated windshield wiper system of claim 14, wherein said electronic control circuit is electrically connectable to a vehicle's power supply.

16. The heated windshield wiper system of claim 15, including a manual switch between said electronic control circuit and said power supply.

* * * * *